United States Patent [19]
Eidsmore

[11] Patent Number: 4,763,114
[45] Date of Patent: Aug. 9, 1988

[54] FLUID FLOW INDICATOR

[76] Inventor: Paul G. Eidsmore, 2 Blue Hill Ct., Scotts Valley, Calif. 95066

[21] Appl. No.: 71,646

[22] Filed: Jul. 9, 1987

[51] Int. Cl.[4] ............................................. G08B 21/00
[52] U.S. Cl. .................................... 340/606; 340/611; 200/82 E; 73/744; 137/557
[58] Field of Search ............... 340/606, 611, 610, 626; 73/744, 714; 137/551, 554, 557; 251/65, 121; 116/70; 200/82 R, 82 C, 82 E

[56] References Cited

U.S. PATENT DOCUMENTS

| | | | |
|---|---|---|---|
| 2,963,563 | 12/1960 | Patterson | 200/81.9 |
| 3,203,246 | 8/1965 | Horwitt et al. | 73/744 |
| 3,327,079 | 6/1967 | Widl | 200/82 |
| 3,507,359 | 4/1970 | Warnock | 184/6 |
| 3,626,474 | 12/1971 | Hammer | 137/554 |
| 3,651,827 | 3/1972 | Hammer et al. | 137/469 |
| 3,896,280 | 7/1975 | Blake | 200/81.9 M |
| 4,130,745 | 12/1978 | Hetzer | 200/82 E |
| 4,148,339 | 4/1979 | Waltrip | 137/553 |
| 4,166,946 | 9/1979 | Tice | 200/82 E |
| 4,181,835 | 1/1980 | Stadler et al. | 200/82 E |
| 4,205,703 | 6/1980 | Silverwater | 137/557 |
| 4,213,021 | 7/1980 | Alexander | 200/81.9 M |
| 4,313,111 | 1/1982 | Anderson | 340/606 |
| 4,429,291 | 2/1984 | Hoffman | 116/70 |
| 4,490,592 | 12/1984 | Haile | 200/81.9 M |
| 4,500,759 | 2/1985 | de Fasselle et al. | 200/82 E |

FOREIGN PATENT DOCUMENTS 1563954 3/1969 France.

Primary Examiner—Joseph A. Orsino
Assistant Examiner—Jill D. Jackson
Attorney, Agent, or Firm—Fay, Sharpe, Beall, Fagan, Minnich & McKee

[57] ABSTRACT

A gas flow indicator comprises a housing defining a cylindrical flow passage having axially spaced first and second ends. A cylindrical piston member having first and second terminal ends and an exterior diameter which is substantially less than the diameter of the passage is axially positioned in the passage with its first terminal end facing the first end of the passage. The piston is mounted for sliding movement from a first position adjacent the first end of the passage to a second position adjacent the second end of the passage when gas flow through the passage exceeds a predetermined level. A flow passageway extends through the piston member from an inlet adjacent the first terminal end to a flow control outlet orifice spaced axially from the first terminal end. A metering a ring surrounds the piston at a location between first terminal end of the piston member and the outlet of the flow passageway when the piston member is in the first position and between the first end of said cylindrical passage and the first terminal end of the piston member when the piston member is in the second position.

11 Claims, 4 Drawing Sheets

FLUID FLOW INDICATOR

BACKGROUND OF THE INVENTION

The subject invention is directed toward the art of sensing devices and, more particularly, to a device for indicating when fluid flow has exceeded a predetermined minimum.

The invention is especially suited for use as a gas flow switch to produce an electrical signal when gas flow through the device has reached a set level and will be described with reference thereto; however, as will become apparent, the invention could be embodied in other devices which, for example, provide a mechanical or pneumatic output signal.

Gas flow indicators of the general type under consideration are known in the art and are shown and described, for example, in U.S. Pat. Nos. 2,963,563; 4,181,835; and 4,313,111. The indicators shown in each of these patents uses a cylindrical magnetic piston slidably mounted in a cylindrical gas flow passageway to actuate a magnetic field responsive switch. Generally, the piston is sized to be only slightly smaller in diameter than the passageway to provide a narrow annular flow space between the piston and the passageway. When gas flow through the device reaches a predetermined level, the pressure build-up on the upstream end of the piston is sufficient to move the piston downstream against a spring or gravity bias. Movement of the magnetic piston actuates an associated reed switch or the like to provide an output signal indicative of a predetermined flow level.

Certain problems exist with these prior devices. For example, there is often an inconsistency present in the devices. In particular, when using a magnet to activate a reed switch, small variations in magnet strength or slight differences in the orientation of the reeds can produce relatively significant differences in the point at which actuation takes place.

The noted problem is further compounded in certain prior devices because their designs are such that movement of the piston in an actuation direction reduces the length of the flow restriction. Thus, as the piston begins moving toward the actuating point, greater and greater flow is required to keep the piston moving. This tends to result in a "dampening" of piston movement and leads to further inconsistencies in the point at which the switch is actuated.

In addition to the above, the prior devices inherently act as flow limiting restrictions in the flow lines and thereby prevent flow levels significantly in excess of the point at which the minimum flow indication is produced. This is an undesirable characteristic in certain systems. For example, in some manufacturing and processing systems a certain minimum gas flow may be required for one phase of system operation but a much larger flow for a subsequent phase of operation or for system purging. To achieve the large flow volume differences with the prior valves it was often necessary to install by-pass piping systems, multiple valve manifolds and the like.

SUMMARY OF THE INVENTION

The present invention provides a significant improvement in gas flow indicators of the general type described. Indicators constructed in accordance with the invention are extremely consistent in operation and can handle flows greatly in excess of the minimum flow indicating point.

In general, the invention comprises a gas flow indicator including a housing having an interior wall which defines a cylindrical flow passage having a gas inlet end and a gas outlet end. A cylindrical piston having axially spaced first and second end faces respectively facing the inlet end and the outlet end is slidably mounted in the passage for axial movement from a first position adjacent the inlet end to a second position adjacent the outlet end in response to flow through the passage exceeding a predetermined minimum level. A circumferentially continuous metering ring extends radially inwardly from the interior wall to define an axially narrow reduced diameter section in the passage intermediate the first and second ends. The ring is axially located to lie circumferentially about the piston member and define an annular flow passage therewith when the piston member is in said first position but the position is such that the ring lies between the inlet end of the passage and the first end face of the piston member when the piston member is in the second position.

By the use of the metering ring located as described, the quantity of flow and the associated pressure drop for fluid passing about the piston does not significantly vary during movement of the piston from the first toward the second position. That is, there is not a progressive increase in fluid flow as the piston begins moving toward the second or indicating position as is present in certain prior art devices. Consequently, with the subject device piston movement is not damped and takes place with substantially a snap action. When the piston is at the second position, it is no longer within the metering ring and fluid can flow through the full interior diameter of the metering ring. Thus, flow quantities greatly in excess of the predetermined minimum required for indicator actuation can pass directly through the indicator.

In accordance with a further aspect of the invention, the piston member includes a flow passageway which extends therethrough from an inlet opening in the end face to an outlet opening which is located between the metering ring and the gas outlet end of the cylindrical passage. Preferably, a metering orifice is formed in the passageway.

By the use of the piston passageway and its metering orifice, the flow level at which indicator actuations takes place is not solely dependent on the size of the annular flow passage between the piston and the metering ring. Thus, indicators having common size bodies, pistons, and metering rings can have a variety of different actuation points merely by varying the metering orifice in the piston passageway. This, of course, simplifies manufacturing and inventory requirements.

Accordingly, a primary object of the invention is the provision of a flow indicator which is relatively simple in construction which can be manufactured or adjusted to indicate at any of a wide range of selected flow rates.

A still further object is the provision of a flow indicator of the type described which can provide a snap actuation indication at a certain predetermined minimum flow level and can then permit much greater flow rates.

BRIEF DESCRIPTION OF THE DRAWINGS

The above and other objects and advantages will become apparent from the following description when read in conjunction with accompanying drawings wherein:

Referring more particularly to the drawings wherein the showings are for the purpose of illustrating a preferred embodiment of the invention only and not for the purpose of limiting same, FIG. 1 shows the overall arrangement of a fluid flow indicating device formed in accordance with the preferred embodiment of the invention. Generally, the device of FIG. 1 comprises a cylindrical main body 10 formed from any suitable material such as stainless steel or the like. Body 10 includes an axially aligned, generally cylindrical through passage 12 which extends from the lower end face 14 to the upper end 16. Although forming no part of the subject invention the body 10 is provided with inlet and outlet fittings 18 and 20 respectively. In the subject embodiment inlet fitting 18 is a welding fitting that is suitably received and positively joined such as by welding to a counterbore 22 formed in the lower end face 14. Outlet fitting 20 is illustrated as a threaded fitting which is welded or otherwise positively joined to a boss 24 extending from end face 18 outwardly about the upper end of flow passage 12.

Figure 1:
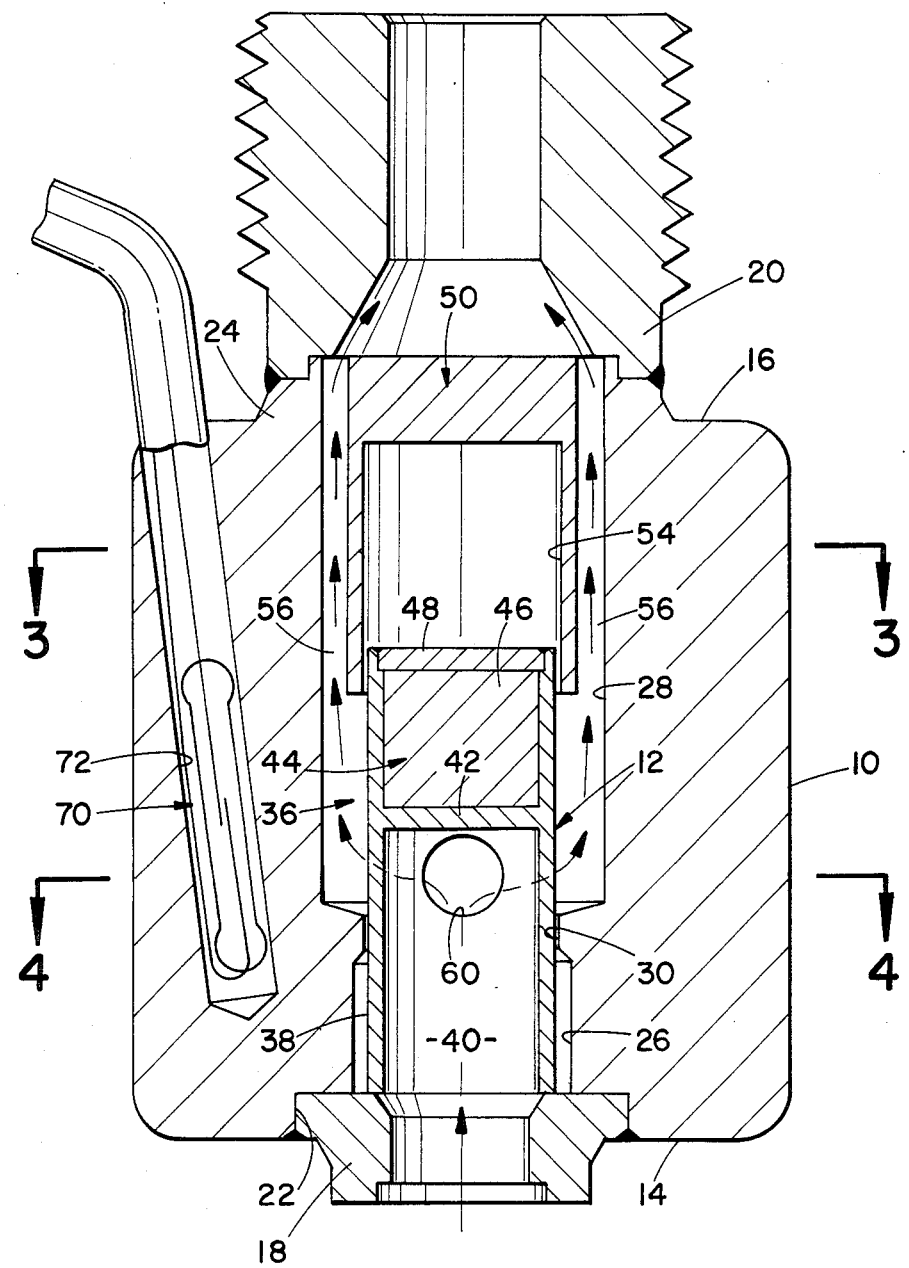
FIG. 1 is a longitudinal cross-sectional view through a flow indicating device formed in accordance with a preferred embodiment of the subject invention.

In the embodiment under consideration, the through flow passage 12 has a generally cylindrical configuration and includes a first passage section 26 which connect with the inlet fitting 18. A second, generally cylindrical section 28 is axially aligned with section 26 and connects to the outlet fitting 20. Positioned between the sections 26 and 28 is a relatively narrow, reduced diameter metering ring section 30.

The purpose and function of metering ring section 30 will subsequently become apparent; however, for the present it should be noted that the metering section 30 can be formed integrally with the body 10 during the formation of the through flow passage 12 or, alternately, installed as a separate component.

Carried within the throughflow passage 12 is a piston member 36. In the embodiment illustrated piston member 36 has a cylindrical outer wall 38 with a diameter only slightly smaller than the open inner diameter of the metering ring section 30. The lower end of piston member 36 is open and defines an inwardly extending cup-shaped chamber 40. The upper or inner end of the chamber 40 is defined by a transverse wall 42. The upper end of the piston member 36 defines a second chamber 44. Chamber 44 contains a magnet member 46. The upper end of chamber 44 is closed by a transverse end wall 48 welded or otherwise postively joined to the side wall 38.

Figure 3:
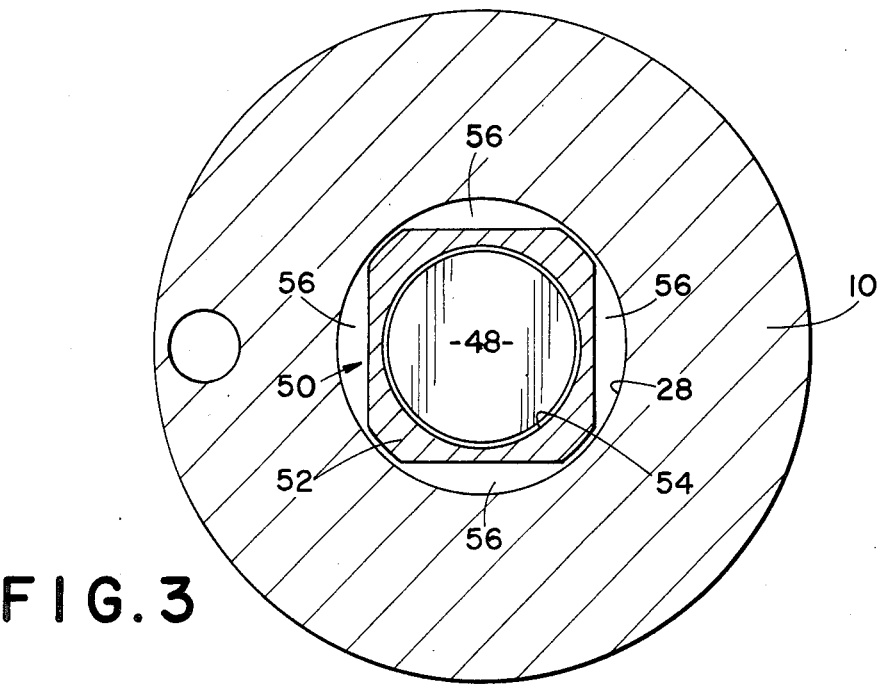
FIG. 3 is a cross-sectional view taken on line 3—3 of FIG. 1.
Figure 4:
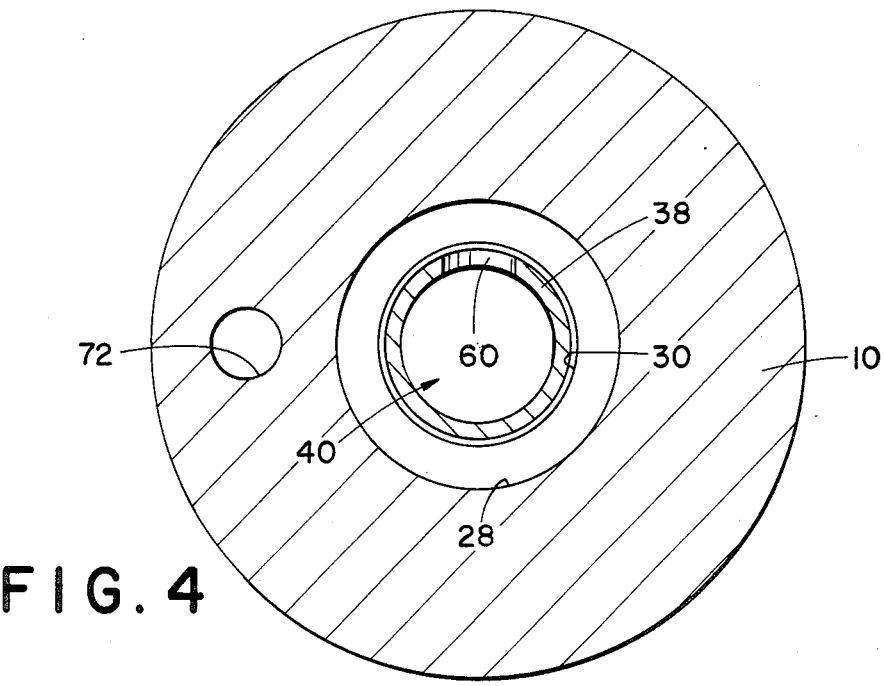
FIG. 4 is a cross-sectional view taken on line 4—4 of FIG. 1.

Mounted at the upper end of the flow passage 12 is a guide assembly 50. Guide assembly 50 is best shown in FIG. 3 and comprises a generally square body 52 which has a cylindrical opening 54 extending axially inward from the lower end. The opening 54 is only slightly larger than the diameter of side wall 38 of piston member 36. As best shown in FIG. 3, the square body 52 is press fitted or otherwise positively positioned in the flow passage section 28 at the location shown. The square configuration of the body provides four flow passages 56 about the exterior.

Figure 2:
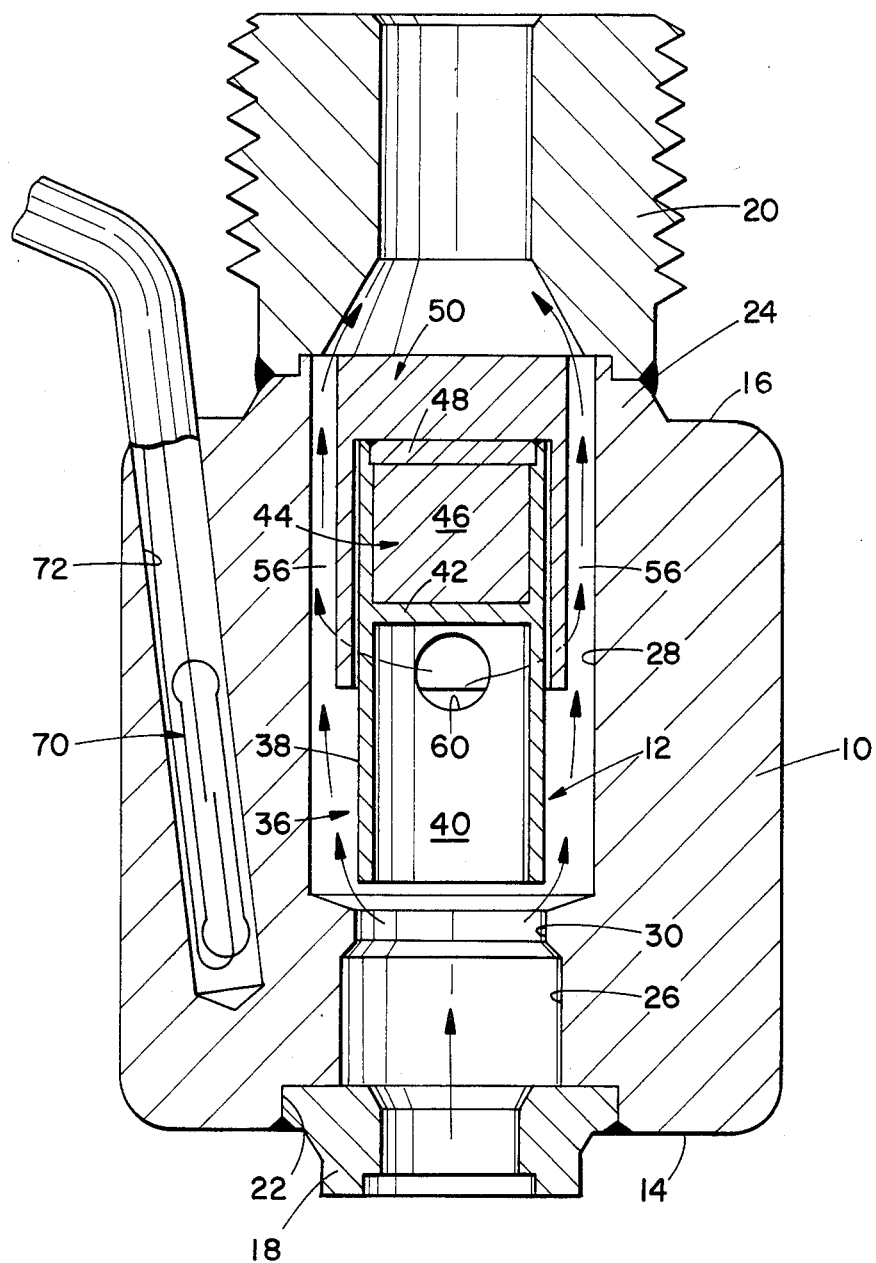
FIG. 2 is a view similar to FIG. 1 but showing the device after the flow indicator has moved to the minimum flow indication position.

FIG. 1 shows the device in a low or no flow condition. That is, the piston member 36 is its lower most position resting on the inlet fitting 18. Flow entering the inlet is received within chamber 40. Flow from chamber 40 is controlled by a flow control orifice 60 formed through the side wall 38. The quantity of flow which can pass through orifice 60 is determined such that the pressure build up within the chamber 40 is not sufficient to move the piston member upwardly until such flow exceeds a predetermined minimum. Flow passing through flow control orifice 60 passes about the exterior of the piston member 36 and through the previously mentioned passages 56 to the outlet end of passage 12. When the flow exceeds the predetermined minimum, the piston member 36 begins moving upwardly and a minor portion of the entering flow can pass about the exterior of piston 38 and through the annular space between the exterior of the piston and the metering ring section 30. Since the annular space is axially narrow, the flow which pass through this area remains substantially constant throughout the upward movement of the piston 36. That is, the flow restriction offered by the metering ring in combination with the exterior of the piston is significantly greater than any restriction encountered in the annular space beneath the metering ring. Consequently, when the flow exceeds the predetermined minimum there is a relatively rapid and fast build up of fluid pressure under the piston member 36 causing it to rapidly move with substantially a snap-action to its upper position shown in FIG. 2. The location of the metering orifice 60 is related to the metering ring section such that metering ring is always upstream of the orifice 60 as shown in FIG. 1.

When the piston member 36 moves to the full open position, the lower end of the piston is above the metering ring portion 30. Consequently, at this time, flow can pass about the lower edge of the piston directly about the exterior of the piston to the outlet passages 56. Consequently, once the minimum flow level is exceeded, the device can handle vastly greater flow levels because neither the metering ring section nor the flow orifice 60 are limiting fluid flow.

In order to provide a useful output indicating that the minimum flow level has been exceeded, the subject device uses a magnetically operated reed switch 70 which is suitably mounted in a bore 72 which extends generally longitudinally into the body 10 as shown. The reed switch 70 is positioned such that movement of the piston from the no flow position of FIG. 1 to the full flow position of FIG. 2 allows the magnet 46 to produce an opening or closing of the reed switch depending upon the particular type of reed switch used. It should be appreciated that other types of actuation indicating means such as proximity switches and the like could equally well be used. The important aspect of the subject invention is the arrangement whereby a simple fluid actuated piston member is caused to move with a snap action to a fully open position at which time the quantity fluid which can pass through the device is many times in excess of that required to produce actuation of the unit.

Figure 5:
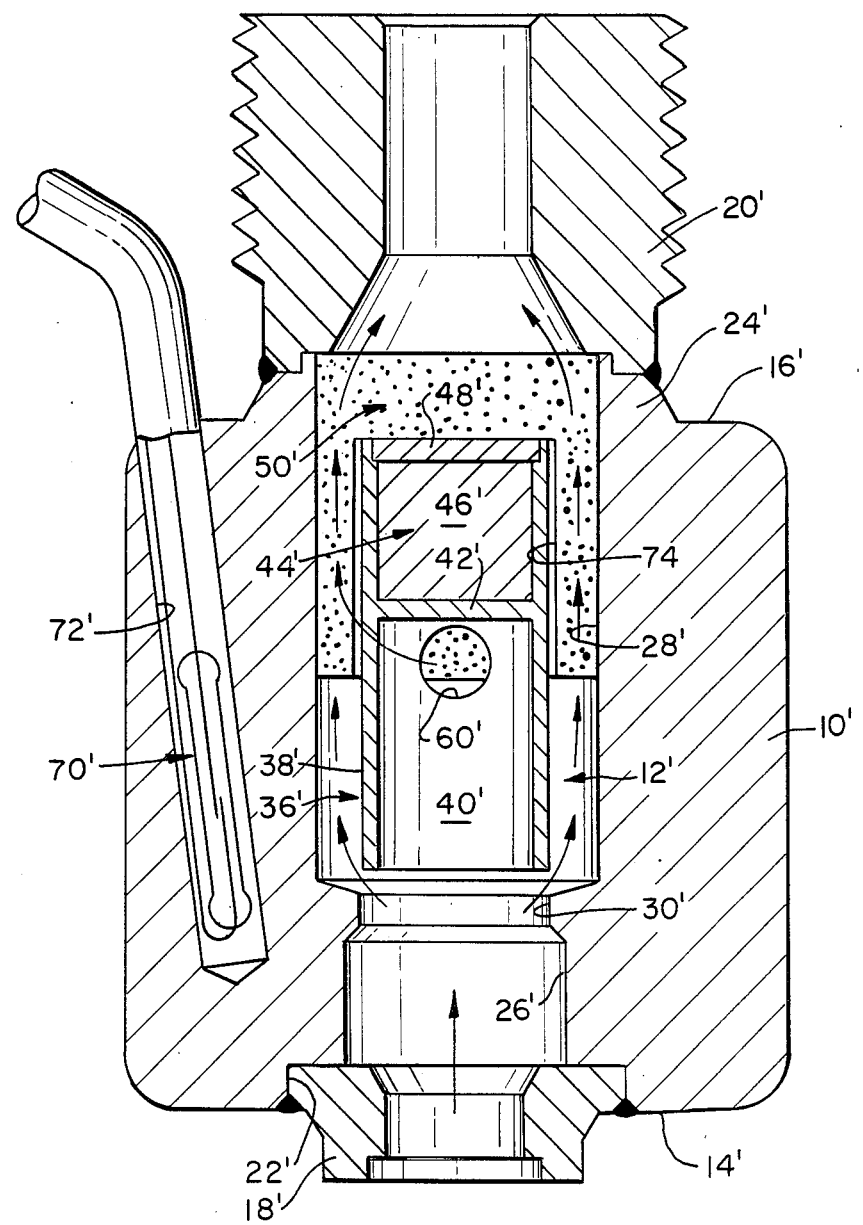
FIG. 5 is a longitudinal cross-sectional view similar to FIG. 2 but showing a second embodiment of the invention.

FIG. 5 illustrates a second embodiment of the invention. The FIG. 5 embodiment is generally the same in most aspects as the FIGS. 1-4. Consequently, the same reference numerals differentiated by the addition of a prime suffix (') have been used to identify the corresponding components. The description of one such component is to be taken as applicable to the other unless otherwise noted.

In the FIG. 5 embodiment the guide assembly 50 comprises a generally cup-shaped body 51 formed of a very porous, sintered, powdered metal. The body 51 has a central opening 74 sized to closely but freely receive the piston member 36' as shown. The exterior of body 51 is sized to be received in passage 12'. As can be appreciated, the body 51 is fixed in the position shown by being press fitted or suitably bonded therein.

By properly selecting the material from which member 51 is formed, the fluid flow indicator can also perform a filtering function in addition to its guiding function.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A gas flow indicator comprising:
   a housing defining a cylindrical flow passage having axially spaced first and second ends;
   gas supply means for supplying gas to said first end of said cylindrical passage;
   gas discharge means for discharging gas from the second end of said cylindrical passage;
   a cylindrical piston member having first and second terminal ends and an exterior diameter which is substantially less than the diameter of said passage, said piston member being axially positioned in said cylindrical passage with said first terminal end facing said first end of said passage and mounted for sliding movement from a first position adjacent said first end of said passage to a second position adjacent said second end of said passage when gas flow through said passage exceeds a predetermined level;
   a flow passageway extending through said piston member from an inlet adjacent the first terminal end to an outlet spaced axially from said first terminal end; said flow passageway including a flow control orifice therein;
   a metering ring formed circumferentially in said cylindrical flow passage and extending radially inwardly into closely spaced relationship with the exterior of said piston member, the location of said metering ring being such as to lie between said first terminal end of said piston member and said outlet of said flow passageway when said piston member is in said first position and between said first end of said cylindrical passage and said first terminal end of said piston member when said piston member is in said second position; and,
   means responsive to movement of said piston member from said first position to said second position for providing a signal exterior to said housing indicative of movement of said piston member.

2. The gas flow indicator of claim 1 including piston guide means mounted in the second end of said cylindrical flow passage for maintaining said piston aligned with said metering ring as said piston member moves from said first position to said second position.

3. The gas flow indicator of claim 1 wherein said piston member has a generally cup-shaped configuration with an open end facing said first end of said cylindrical flow passage.

4. The gas flow indicator as defined in claim 1 wherein said metering ring is circumferentially continuous and has a narrow apex portion closely spaced from the exterior of said piston to define an annular flow passage.

5. The gas flow indicator as defined in claim 4 wherein said flow passageway opens laterally from piston member.

6. In a gas flow indicator including a housing having an interior wall defining a cylindrical flow passage having a gas inlet end, and a gas outlet end, a cylindrical piston having axially spaced first and second end faces respectively facing said inlet end and said outlet end is slidably mounted in the said passage for axial movement from a first position adjacent the inlet end to a second position adjacent the outlet end in response to flow through the passage exceeding a predetermined minimum level, the improvement comprising:
   a circumferentially continuous metering ring extending radially inwardly from said interior wall to define an axially narrow reduced diameter section in said passage intermediate said first and second ends, said ring being axially located such as to lie circumferentially about said piston member and define an annular flow passage therewith when said piston member is in said first position but lying between said inlet end of said passage and the first end face of said piston member when said piston member is in said second position.

7. The gas flow indicator of claim 6 wherein said piston member includes a flow passageway extending therethrough from an inlet opening in said first end face to an outlet opening which is between said metering ring and said gas outlet end of said cylindrical passage.

8. The gas flow indicator of claim 7 including piston guide means for maintaining said piston member aligned with said metering ring when said piston is in said second position.

9. The gas flow indicator of claim 7 including a flow control orifice in said flow passageway.

10. The gas flow indicator of claim 9 wherein said flow control orifice is defined by the outlet opening of said passageway.

11. The gas flow indicator of claim 8 wherein said piston guide means comprises a porous body positioned in said outlet end of said passage.

* * * * *